US011949135B2

(12) United States Patent
Ghezel-Ayagh

(10) Patent No.: US 11,949,135 B2
(45) Date of Patent: Apr. 2, 2024

(54) MOLTEN CARBONATE FUEL CELL ANODE EXHAUST POST-PROCESSING FOR CARBON DIOXIDE CAPTURE

(71) Applicant: FuelCell Energy, Inc., Danbury, CT (US)

(72) Inventor: Hossein Ghezel-Ayagh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 719 days.

(21) Appl. No.: 17/089,301

(22) Filed: Nov. 4, 2020

(65) Prior Publication Data

US 2021/0050610 A1 Feb. 18, 2021

Related U.S. Application Data

(62) Division of application No. 16/095,261, filed as application No. PCT/US2017/028594 on Apr. 20, 2017, now Pat. No. 11,211,625.

(Continued)

(51) Int. Cl.
*H01M 8/0668* (2016.01)
*B01D 53/047* (2006.01)

(Continued)

(52) U.S. Cl.
CPC ........ *H01M 8/0668* (2013.01); *B01D 53/047* (2013.01); *B01D 53/263* (2013.01);

(Continued)

(58) Field of Classification Search
CPC ............. H01M 8/0668; H01M 8/0662; H01M 8/04097; H01M 8/0681; H01M 8/04164;

(Continued)

(56) References Cited

U.S. PATENT DOCUMENTS 4,449,994 A 5/1984 Hegarty et al.
4,476,633 A 10/1984 Shah et al.

(Continued)

FOREIGN PATENT DOCUMENTS

CA 2956439 4/2017
CN 101285004 A 10/2008

(Continued)

OTHER PUBLICATIONS

Anonymous: 11 PROX—Wikipedia, Dec. 29, 2015 (Dec. 29, 2015), XP055569545, Retrieved from the Internet: URL:https://en.wikipedia.org/w/index.php?title=PROX&oldid=697317259 [retrieved on Mar. 14, 2019].

(Continued)

*Primary Examiner* — Basia A Ridley
*Assistant Examiner* — Heng M. Chan
(74) *Attorney, Agent, or Firm* — Foley & Lardner LLP

(57) ABSTRACT

A fuel cell system includes: a first fuel cell including a first anode and a first cathode, wherein the first anode is configured to output a first anode exhaust gas; a first oxidizer configured to receive the first anode exhaust gas and air from a first air supply, to react the first anode exhaust gas and the air in a preferential oxidation reaction, and to output an oxidized gas; a second fuel cell configured to act as an electrochemical hydrogen separator, the second fuel cell including: a second anode configured to receive the oxidized gas from the first oxidizer and to output a second anode exhaust gas, and a second cathode configured to output a hydrogen stream; and a condenser configured to receive the second anode exhaust gas and to separate water and $CO_2$.

11 Claims, 4 Drawing Sheets

Related U.S. Application Data

(60) Provisional application No. 62/325,711, filed on Apr. 21, 2016.

(51) Int. Cl.

| | |
|---|---|
| ***B01D 53/26*** | (2006.01) |
| ***B01D 53/32*** | (2006.01) |
| ***H01M 8/04014*** | (2016.01) |
| ***H01M 8/04089*** | (2016.01) |
| ***H01M 8/04119*** | (2016.01) |
| ***H01M 8/04828*** | (2016.01) |
| ***H01M 8/0612*** | (2016.01) |
| ***H01M 8/0662*** | (2016.01) |
| *H01M 8/14* | (2006.01) |

(52) U.S. Cl.

CPC ...... *B01D 53/326* (2013.01); *H01M 8/04014* (2013.01); *H01M 8/04022* (2013.01); *H01M 8/04097* (2013.01); *H01M 8/04164* (2013.01); *H01M 8/04828* (2013.01); *H01M 8/0612* (2013.01); *H01M 8/0662* (2013.01); *H01M 8/0681* (2013.01); *B01D 2256/22* (2013.01); *B01D 2257/108* (2013.01); *B01D 2257/80* (2013.01); *H01M 2008/147* (2013.01); *Y02C 20/40* (2020.08)

(58) Field of Classification Search

CPC ............. H01M 8/04828; B01D 53/326; B01D 2256/22; B01D 2257/108; B01D 2257/80; Y02C 20/40; Y02E 60/50

See application file for complete search history.

(56) References Cited

U.S. PATENT DOCUMENTS

| | | | |
|---|---|---|---|
| 4,476,683 | A | 10/1984 | Shah et al. |
| 4,532,192 | A | 7/1985 | Baker et al. |
| 4,828,940 | A | 5/1989 | Cohen et al. |
| 5,518,828 | A | 5/1996 | Senetar |
| 6,063,515 | A | 5/2000 | Epp et al. |
| 6,162,556 | A | 12/2000 | Vollmar et al. |
| 6,280,865 | B1 | 8/2001 | Eisman et al. |
| 6,517,963 | B2 | 2/2003 | Lakshmanan et al. |
| 6,660,069 | B2 | 12/2003 | Sato et al. |
| 6,821,664 | B2 | 11/2004 | Parks et al. |
| 6,833,207 | B2 | 12/2004 | Joos et al. |
| 6,866,950 | B2 | 3/2005 | Connor et al. |
| 6,887,601 | B2 | 5/2005 | Moulthrop et al. |
| 6,924,053 | B2 | 8/2005 | McElroy |
| 6,994,929 | B2 | 2/2006 | Barbir et al. |
| 7,011,903 | B2 | 3/2006 | Benson et al. |
| 7,014,940 | B2 | 3/2006 | Hase et al. |
| 7,041,272 | B2 | 5/2006 | Keefer et al. |
| 7,045,233 | B2 | 5/2006 | McElroy et al. |
| 7,097,925 | B2 | 8/2006 | Keefer |
| 7,132,182 | B2 | 11/2006 | McElroy et al. |
| 7,141,323 | B2 | 11/2006 | Ballantine et al. |
| 7,255,949 | B2 | 8/2007 | Coors et al. |
| 7,276,306 | B2 | 10/2007 | Pham et al. |
| 7,285,350 | B2 | 10/2007 | Keefer et al. |
| 7,416,800 | B2 | 8/2008 | Benson et al. |
| 7,482,078 | B2 | 1/2009 | Sridhar et al. |
| 7,520,916 | B2 | 4/2009 | McElroy et al. |
| 7,591,880 | B2 | 9/2009 | Levan et al. |
| 7,601,207 | B2 | 10/2009 | Moulthrop et al. |
| 7,604,684 | B2 | 10/2009 | Menzel |
| 7,674,539 | B2 | 3/2010 | Keefer et al. |
| 7,691,507 | B2 | 4/2010 | Ballantine et al. |
| 7,752,848 | B2 | 7/2010 | Balan et al. |
| 7,833,668 | B2 | 11/2010 | Ballantine et al. |
| 7,846,599 | B2 | 12/2010 | Ballantine et al. |
| 7,883,803 | B2 | 2/2011 | McElroy et al. |
| 7,968,237 | B2 | 6/2011 | Grieve et al. |
| 8,062,799 | B2 | 11/2011 | Jahnke et al. |
| 8,071,241 | B2 | 12/2011 | Sridhar et al. |
| 8,101,307 | B2 | 1/2012 | McElroy et al. |
| 8,158,290 | B2 | 4/2012 | Penev et al. |
| 8,241,400 | B2 | 8/2012 | Grover |
| 8,293,412 | B2 | 10/2012 | McElroy |
| 8,343,671 | B2 | 1/2013 | Qi |
| 8,530,101 | B2 | 9/2013 | Qi |
| 8,790,618 | B2 | 7/2014 | Adams et al. |
| 8,815,462 | B2 | 8/2014 | Ghezel-Ayagh et al. |
| 9,315,397 | B2 | 4/2016 | Sivret |
| 9,365,131 | B2 | 6/2016 | Jamal et al. |
| 9,455,458 | B2 | 9/2016 | Yu et al. |
| 9,455,463 | B2 | 9/2016 | Berlowitz et al. |
| 9,499,403 | B2 | 11/2016 | Al-Muhaish et al. |
| 9,502,728 | B1 | 11/2016 | Farooque et al. |
| 9,520,607 | B2 | 12/2016 | Berlowitz et al. |
| 9,531,024 | B2 | 12/2016 | Pollica et al. |
| 9,586,171 | B2 | 3/2017 | Vanzandt et al. |
| 9,861,931 | B2 | 1/2018 | Kuopanportti et al. |
| 2002/0142198 | A1 | 10/2002 | Towler et al. |
| 2003/0143448 | A1 | 7/2003 | Keefer |
| 2003/0157383 | A1 | 8/2003 | Takahashi |
| 2003/0207161 | A1 | 11/2003 | Rusta-Sallehy et al. |
| 2004/0028979 | A1 | 2/2004 | Ballantine et al. |
| 2004/0146760 | A1 | 7/2004 | Miwa |
| 2004/0166384 | A1 | 8/2004 | Schafer |
| 2004/0197612 | A1 | 10/2004 | Keefer et al. |
| 2004/0221578 | A1 | 11/2004 | Iijima et al. |
| 2004/0229102 | A1 | 11/2004 | Jahnke et al. |
| 2005/0003247 | A1 | 1/2005 | Pham |
| 2005/0074657 | A1 | 4/2005 | Rusta-Sallehy et al. |
| 2005/0098034 | A1 | 5/2005 | Gittleman et al. |
| 2005/0123810 | A1 | 6/2005 | Balan |
| 2005/0227137 | A1 | 10/2005 | Suga |
| 2005/0233188 | A1 | 10/2005 | Kurashima et al. |
| 2005/0271914 | A1 | 12/2005 | Farooque et al. |
| 2006/0115691 | A1 | 6/2006 | Hilmen et al. |
| 2006/0188761 | A1 | 8/2006 | O'Brien et al. |
| 2007/0009774 | A1 | 1/2007 | Clawson et al. |
| 2007/0031718 | A1 | 2/2007 | Fujimura et al. |
| 2007/0044657 | A1 | 3/2007 | Laven et al. |
| 2007/0065688 | A1 | 3/2007 | Shimazu et al. |
| 2007/0111054 | A1 | 5/2007 | Gottmann et al. |
| 2007/0141409 | A1 | 6/2007 | Cho et al. |
| 2007/0178338 | A1* | 8/2007 | McElroy ............. B01D 53/228 429/492 |
| 2007/0193885 | A1 | 8/2007 | Benicewicz et al. |
| 2007/0243475 | A1 | 10/2007 | Funada et al. |
| 2007/0246363 | A1 | 10/2007 | Eisman et al. |
| 2007/0246374 | A1 | 10/2007 | Eisman et al. |
| 2008/0063910 | A1 | 3/2008 | Okuyama et al. |
| 2008/0171244 | A1 | 7/2008 | Okuyama et al. |
| 2008/0241612 | A1 | 10/2008 | Ballantine et al. |
| 2008/0241638 | A1 | 10/2008 | McElroy et al. |
| 2008/0245101 | A1 | 10/2008 | Dubettier-Grenier et al. |
| 2008/0292921 | A1 | 11/2008 | Lakshmanan et al. |
| 2008/0299425 | A1 | 12/2008 | Kivisaari et al. |
| 2008/0311445 | A1 | 12/2008 | Venkataraman et al. |
| 2009/0068512 | A1 | 3/2009 | Gofer et al. |
| 2009/0084085 | A1 | 4/2009 | Kawai |
| 2009/0155637 | A1 | 6/2009 | Cui et al. |
| 2009/0155644 | A1 | 6/2009 | Cui et al. |
| 2009/0155645 | A1 | 6/2009 | Cui et al. |
| 2009/0155650 | A1 | 6/2009 | Cui et al. |
| 2009/0186244 | A1 | 7/2009 | Mayer |
| 2010/0028730 | A1 | 2/2010 | Ghezel-Ayagh |
| 2010/0047641 | A1 | 2/2010 | Jahnke et al. |
| 2010/0104903 | A1 | 4/2010 | Gummalla et al. |
| 2010/0126180 | A1 | 5/2010 | Forsyth et al. |
| 2010/0199559 | A1 | 8/2010 | Hallett et al. |
| 2010/0239924 | A1 | 9/2010 | McElroy et al. |
| 2010/0243475 | A1 | 9/2010 | Eisman et al. |
| 2010/0266923 | A1 | 10/2010 | McElroy et al. |
| 2010/0279181 | A1 | 11/2010 | Adams et al. |
| 2012/0000243 | A1 | 1/2012 | Bough et al. |
| 2012/0034538 | A1 | 2/2012 | Jahnke et al. |
| 2012/0058042 | A1 | 3/2012 | Zauderer |
| 2012/0167620 | A1 | 7/2012 | Van Dorst et al. |

(56) References Cited

U.S. PATENT DOCUMENTS

| | | | |
|---|---|---|---|
| 2012/0189922 | A1 | 7/2012 | Schmidt et al. |
| 2012/0291483 | A1 | 11/2012 | Terrien et al. |
| 2013/0014484 | A1 | 1/2013 | Caprile et al. |
| 2013/0111948 | A1 | 5/2013 | Higginbotham |
| 2013/0126038 | A1 | 5/2013 | Jamal et al. |
| 2013/0259780 | A1 | 10/2013 | Handagama et al. |
| 2014/0260310 | A1 | 9/2014 | Berlowitz et al. |
| 2014/0302413 | A1 | 10/2014 | Berlowitz |
| 2014/0329160 | A1 | 11/2014 | Ramaswamy et al. |
| 2014/0352309 | A1 | 12/2014 | Kim et al. |
| 2015/0089951 | A1 | 4/2015 | Barckholtz et al. |
| 2015/0111160 | A1 | 4/2015 | Brunhuber et al. |
| 2015/0122122 | A1 | 5/2015 | W Mustapa et al. |
| 2015/0191351 | A1 | 7/2015 | Darde et al. |
| 2015/0266393 | A1 | 9/2015 | Jamal et al. |
| 2015/0280265 | A1 | 10/2015 | Mclarty |
| 2015/0321914 | A1 | 11/2015 | Darde et al. |
| 2016/0248110 | A1 | 8/2016 | Ghezel-Ayagh |
| 2016/0265122 | A1 | 9/2016 | Zhu et al. |
| 2016/0351930 | A1 | 12/2016 | Jahnke et al. |
| 2016/0365590 | A1 | 12/2016 | Zheng et al. |
| 2016/0365594 | A1 | 12/2016 | Zheng et al. |
| 2017/0130582 | A1 | 5/2017 | Hsu |
| 2017/0141421 | A1 | 5/2017 | Sundaram et al. |
| 2017/0250429 | A1 | 8/2017 | Diethelm et al. |
| 2020/0307997 | A1 | 10/2020 | Tranier |

FOREIGN PATENT DOCUMENTS

| | | | | |
|---|---|---|---|---|
| CN | 101809396 | A | | 8/2010 |
| CN | 102422108 | A | | 4/2012 |
| CN | 104847424 | A | | 8/2015 |
| CN | 105050945 | A | | 11/2015 |
| CN | 107251297 | A | | 10/2017 |
| EP | 1 306 916 | A1 | | 5/2003 |
| EP | 1 790 027 | A2 | | 5/2007 |
| EP | 2 589 902 | A2 | | 5/2013 |
| EP | 1 841 515 | B1 | | 6/2016 |
| EP | 2 011 183 | B1 | | 6/2016 |
| EP | 1 996 533 | B1 | | 7/2016 |
| EP | 1 273 061 | B1 | | 8/2016 |
| EP | 1 344 270 | B1 | | 6/2017 |
| EP | 2 589 908 | A2 | | 8/2018 |
| EP | 3 360 189 | A1 | | 8/2018 |
| IT | MI20091246.6 | A1 | | 1/2011 |
| JP | S62-241524 | A | | 10/1987 |
| JP | 02-281569 | | | 11/1990 |
| JP | H04-334870 | A | | 11/1992 |
| JP | 11-312527 | A | | 11/1999 |
| JP | 11312527 | A | * | 11/1999 |
| JP | H11-312527 | A | | 11/1999 |
| JP | 2001-023670 | A | | 1/2001 |
| JP | 2002-334714 | A | | 11/2002 |
| JP | 2004-171802 | | | 6/2004 |
| JP | 2005-179083 | | | 7/2005 |
| JP | 2007-018907 | A | | 1/2007 |
| JP | 2007-201349 | A | | 8/2007 |
| JP | 2008-507113 | A | | 3/2008 |
| JP | 2009-503788 | A | | 1/2009 |
| JP | 2009-503790 | A | | 1/2009 |
| JP | 2009-108241 | A | | 5/2009 |
| JP | 2010-055927 | A | | 3/2010 |
| JP | 2010-228963 | A | | 10/2010 |
| JP | 2011-141967 | A | | 7/2011 |
| JP | 2011-181440 | A | | 9/2011 |
| JP | 2011-207741 | A | | 10/2011 |
| JP | 2012-519649 | A | | 8/2012 |
| JP | 2012-531719 | | | 12/2012 |
| JP | 2016-115479 | A | | 6/2016 |
| KR | 1020130075492 | A | | 7/2013 |
| WO | WO-2007/015689 | A2 | | 2/2007 |
| WO | WO-2009/013455 | A2 | | 1/2009 |
| WO | WO-2009/059571 | A1 | | 5/2009 |
| WO | WO-2011/089382 | A2 | | 7/2011 |
| WO | WO-2012/176176 | A1 | | 12/2012 |
| WO | WO-2014/151207 | | | 9/2014 |
| WO | WO-2015/059507 | A1 | | 4/2015 |
| WO | WO-2015/116964 | A1 | | 8/2015 |
| WO | WO-2015/124183 | A1 | | 8/2015 |
| WO | WO-2015/124700 | A1 | | 8/2015 |
| WO | WO-2015/133757 | A1 | | 9/2015 |
| WO | WO-2016/100849 | A1 | | 6/2016 |
| WO | WO-2016/196952 | A1 | | 12/2016 |
| WO | WO-2019/175850 | | | 9/2019 |

OTHER PUBLICATIONS

Extended European Search Report in EP17786629.0 dated Mar. 26, 2019 (9 pages).

First Office Action in JP 2018-555215 dated Dec. 20, 2019, with English machine translation (8 pages).

International Search Report and Written Opinion dated Aug. 24, 2017 in PCT/US2017/028594 (13 pages).

Notice of Preliminary Rejection in KR 10-2018-7033320 dated Apr. 17, 2020, with English translation (15 pages).

Extended European Search Report in EP21154960.5 dated May 17, 2021 (9 pages).

Communication pursuant to Article 94(3) EPC in EP 17786599.5 dated Jan. 30, 2020 (6 pages).

Extended European Search Report for EP17786599.5 dated May 20, 2019 (7 pages).

Extended European Search Report in EP17790107.1 dated Nov. 29, 2019 (7 pages).

First Office Action in JP 2018-554735 dated Nov. 11, 2019, with English translation (8 pages).

First Office Action in JP 2018-556825 dated Feb. 25, 2020, with English translation (14 pages).

International Preliminary Report on Patentability in PCT/US2016/035745 dated Dec. 14, 2017 (7 pages).

International Preliminary Report on Patentability in PCT/US2017/027261 dated Nov. 8, 2018 (8 pages).

International Preliminary Report on Patentability in PCT/US2017/028487 dated Oct. 23, 2018 (8 pages).

International Preliminary Report on Patentability in PCT/US2017/029667 dated Nov. 8, 2018 (6 pages).

International Search Report and Written Opinion dated Jul. 14, 2017 for PCT/US2017/029667 (7 pages).

International Search Report and Written Opinion in PCT/US2016/035745 dated Sep. 30, 2016 (10 pages.

International Search Report and Written Opinion in PCT/US2017/027261 dated Jul. 3, 2017 (10 pages).

International Search Report and Written Opinion in PCT/US2017/028487 dated Jul. 10, 2017 (8 pages).

International Search Report and Written Opinion in PCT/US2017/028526 dated Jul. 17, 2017 (8 pages).

Non-Final Office Action in U.S. Appl. No. 16/096,596 dated May 13, 2019.

Non-Final Office Action on U.S. Appl. No. 15/298,316 dated Jun. 22, 2018.

Notice of Allowance in U.S. Appl. No. 16/095,281 dated Jul. 17, 2020.

Notice of Allowance in U.S. Appl. No. 16/096,596 dated Aug. 28, 2019.

Notice of Preliminary Rejection in KR 10-2018-7033915 dated Apr. 17, 2020, with English translation (13 pages).

Office Action in CA 3022534 dated Sep. 17, 2019 (3 pages).

Office Action in CA Pat Appl No. 2988295 dated Feb. 5, 2018.

Office Action in CA Pat. Appl. 3021632 dated Oct. 3, 2019.

Office Action in JP 2017-563016 dated Jul. 13, 2018 (5 pages, no translation available).

U.S. Notice of Allowance in U.S. Appl. No. 14/732,032 dated Aug. 23, 2016.

U.S. Office Action in U.S. Appl. No. 14/732,032 dated Dec. 16, 2015 (11 pages).

U.S. Office Action in U.S. Appl. No. 14/732,032 dated May 13, 2016 (14 pages).

(56) References Cited

OTHER PUBLICATIONS

PCT International Search Report and Written Opinion dated Jun. 16, 2021 in International Application No. PCT/IB2021/051922 (11 pages).

* cited by examiner

MOLTEN CARBONATE FUEL CELL ANODE EXHAUST POST-PROCESSING FOR CARBON DIOXIDE CAPTURE

CROSS-REFERENCE TO RELATED PATENT APPLICATION

This application is a divisional of U.S. patent application Ser. No. 16/095,261 filed on Oct. 19, 2018, which is a U.S. National Phase application under 35 U.S.C. § 371 of International Application No. PCT/US2017/028594, filed on Apr. 20, 2017, which claims the benefit of U.S. Provisional Patent Application No. 62/325,711, filed on Apr. 21, 2016, which are hereby incorporated by reference in their entireties.

BACKGROUND

The present disclosure relates to carbon dioxide ($CO_2$) separation in direct molten carbonate fuel cells ("DFC"). In particular, the present disclosure relates to an electrochemical hydrogen separator ("EHS") receiving a $CO_2$-rich anode exhaust stream from a DFC and concentrating the $CO_2$ for sequestration.

In a $CO_2$ separation system for a DFC, the $CO_2$-rich anode exhaust stream also contains water vapor and unused fuel, including mostly hydrogen and carbon monoxide (CO). To make the stream ready for $CO_2$ capture (i.e., separation) for sequestration or use, some processing or post-treatment is required.

SUMMARY

In certain embodiments, a fuel cell system includes a first fuel cell having a first anode and a first cathode, wherein the first anode is configured to output a first anode exhaust gas. The system further includes a first oxidizer configured to receive the first anode exhaust gas and air from a first air supply, to react the first anode exhaust gas and the air in a preferential oxidation reaction, and to output an oxidized gas. The system further includes a second fuel cell configured to act as an electrochemical hydrogen separator ("EHS"). The second fuel cell includes a second anode configured to receive the oxidized gas from the first oxidizer and to output a second anode exhaust gas, and a second cathode configured to output a hydrogen stream. The system further includes a condenser configured to receive the second anode exhaust gas and to separate water and $CO_2$.

In other embodiments, a method of processing fuel cell exhaust includes, at a first oxidizer, receiving a first anode exhaust gas from a first anode of a first fuel cell and air from a first air supply, and outputting an oxidized gas from the first oxidizer. The method further includes, at a second fuel cell having a second anode and a second cathode, receiving the oxidized gas at the second anode, electrochemically separating hydrogen in the oxidized gas, outputting a hydrogen stream from the second cathode, and outputting a second anode exhaust gas from the second anode.

In other embodiments, a fuel cell system includes a fuel cell having an anode and a cathode, wherein the anode is configured to output an anode exhaust gas. The system further includes a condenser configured to receive and condense the anode exhaust gas, to separate water from the anode exhaust gas to form a dried anode exhaust gas, and to separately output the water and the dried anode exhaust gas. The system further includes a pressure swing adsorption unit configured to receive the dried anode exhaust gas, and to output a hydrogen stream and a separate $CO_2$ stream.

In other embodiments, a method of processing fuel cell exhaust includes, at a condenser, receiving anode exhaust gas from an anode of a fuel cell, outputting a dried anode exhaust gas stream, and separately outputting a water stream. The method further includes, at a first compressor, compressing the dried anode exhaust gas stream and outputting a compressed anode exhaust gas stream. The method further includes, at a pressure swing adsorption ("PSA") unit, receiving the compressed anode exhaust gas stream, outputting a hydrogen stream, and separately outputting a $CO_2$ stream.

These and other advantageous features will become apparent to those reviewing the disclosure and drawings.

DETAILED DESCRIPTION

Referring generally to the figures, disclosed herein is a fuel cell subsystem for post-processing fuel cell anode exhaust gas to provide $CO_2$ sequestration.

Conventionally, combustibles in an anode exhaust gas may be reacted in an oxidizer. Oxygen rather than air is supplied to the oxidizer because nitrogen present in air may dilute the $CO_2$ in the anode exhaust gas. An air separation subsystem must be incorporated to provide the necessary oxygen to the oxidizer. However, when using oxygen, water is injected as a coolant in the oxidizer to maintain the oxidizer at a desired temperature level (e.g., to avoid overheating a catalyst). The oxidizer generates an oxidizer exhaust including at least water and $CO_2$. Heat generated in the oxidizer is then used to preheat a cathode inlet stream. After recuperative heat exchange, the anode exhaust/oxidizer exhaust stream is cooled down in a condenser to remove water. A condenser downstream from the oxidizer separates and removes the injected water and any other water present in the exhaust stream, generating oxidizer exhaust with a higher concentration of $CO_2$ ready for sequestration. In one example, when feeding oxygen to an oxidizer in a fuel cell system using greenhouse gas ("GHG") from a pulverized coal ("PC") boiler steam cycle power plant, the $CO_2$ stream for sequestration contains approximately 89% $CO_2$ and 10% water, with 74% fuel utilization. When air is fed to the oxidizer rather than oxygen, the $CO_2$ content is reduced to approximately 58%.

Figure 1:
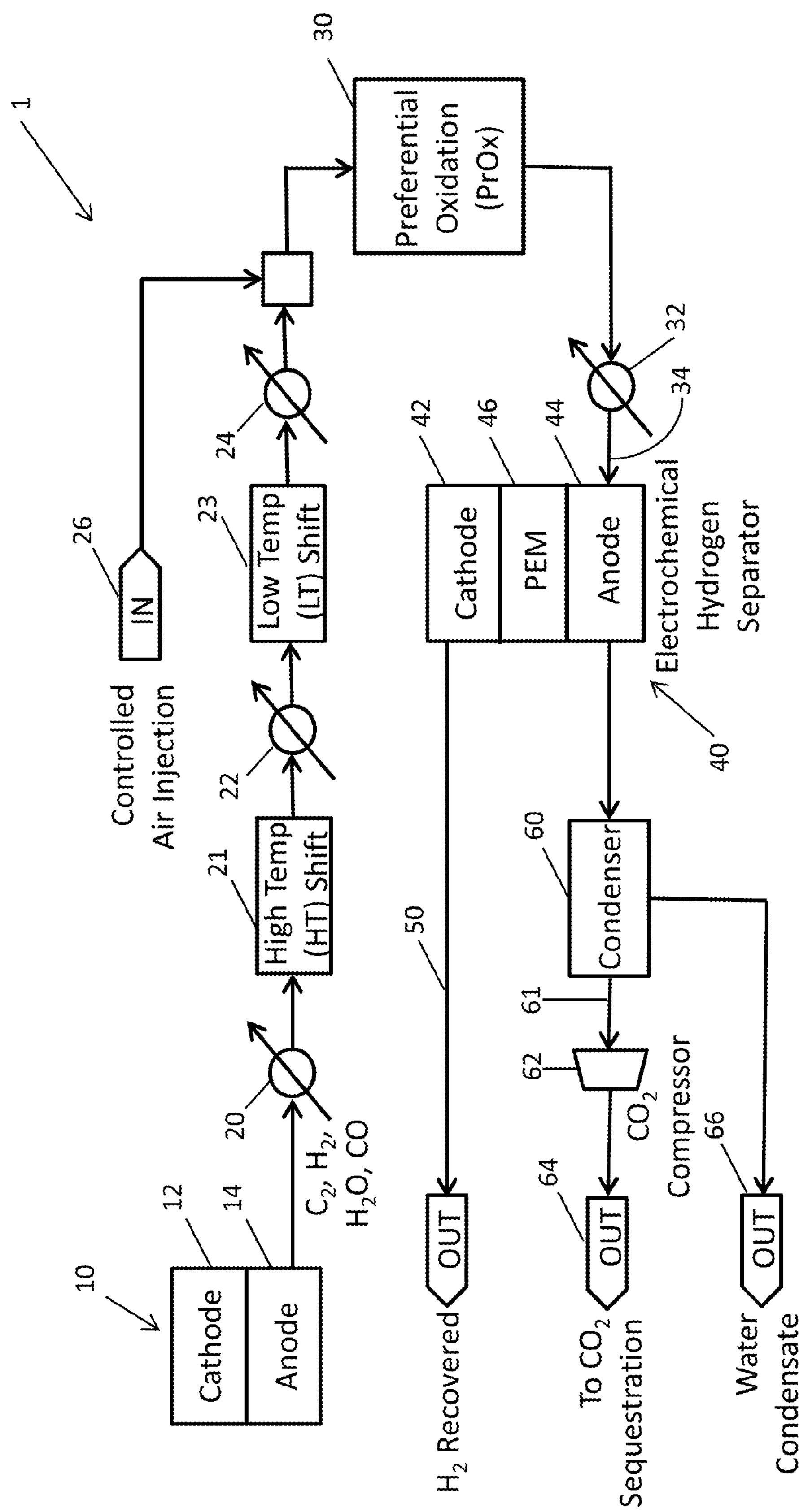
FIG. 1 shows a schematic view of a fuel cell system including a $CO_2$ sequestration subsystem using an electrochemical hydrogen separator, according to an exemplary embodiment.

Referring to FIG. 1, a post-treatment system is shown according to an exemplary embodiment. The process includes recovering hydrogen such that, after providing the required heat to a the cathode inlet stream, excess hydrogen is isolated as a co-product. According to another exemplary embodiment, the excess hydrogen is recycled to a DFC anode as supplementary fuel.

A fuel cell system 1 includes a first fuel cell 10 having a cathode 12 (i.e., a first cathode) and an anode 14 (i.e., a first anode). According to an exemplary embodiment, the first fuel cell 10 may be a DFC. The anode 14 outputs an anode exhaust gas, including at least $CO_2$, hydrogen, water, and CO. A first heat exchanger 20 receives the anode exhaust gas from the DFC and partially cools the anode exhaust gas. The first heat exchanger 20 then outputs a first partially-cooled gas. The first partially-cooled gas is transformed through a high-temperature ("HT") CO shift reaction (e.g., water-gas shift reaction) in a first shift reactor 21, forming a first shifted gas, which is received by a second heat exchanger 22. The first shift reactor 21 is configured to operate at a first temperature in a range of approximately 310° C. to 450° C. The first shift reactor 21 may be configured to shift CO and water into $CO_2$ and hydrogen, such that the first shifted gas has a higher concentration of $CO_2$ and hydrogen than the first partially-cooled gas. The second heat exchanger 22 partially cools the first shifted gas and outputs a second partially-cooled gas. The second partially-cooled gas is transformed through a low-temperature ("LT") CO shift reaction in a second shift reactor 23, forming a second shifted gas, which is received by a third heat exchanger 24. The second shift reactor 23 is configured to operate at a second temperature in a range of approximately 200° C. to 250° C., such that the first temperature is higher than the second temperature. The second shift reactor 23 may be configured to shift CO and water into $CO_2$ and hydrogen, such that the second shifted gas has a higher concentration of $CO_2$ and hydrogen than the second partially-cooled gas. The third heat exchanger 24 cools the second shifted gas to a desired temperature and outputs a cooled gas. According to an exemplary embodiment, the temperature of the cooled gas is based on a range of temperatures acceptable by an oxidizer 30 downstream from the third heat exchanger 24.

The cooled gas is mixed with air, rather than oxygen, which is provided (i.e., injected) by an air supply 26 (i.e., first air supply, controlled air supply, etc.), forming a mixed gas. According to an exemplary embodiment, the air supply 26 may be controlled to establish a preferred ratio of air to any one of $CO_2$, hydrogen, water, and/or CO making up the cooled gas. This preferred ratio may be based on the requirements of the oxidizer. The mixed gas is then fed to the oxidizer 30, which is configured to perform a preferential oxidation reaction for conversion of CO to $CO_2$. Preferential oxidation is a chemical process for removing CO. This process uses a low-temperature shift reactor (e.g., similar to the second shift reactor 23) followed by a staged preferential oxidizer for oxidizing CO using oxygen in the presence of a noble metal catalyst (e.g., platinum, palladium-cobalt, palladium-copper, gold, etc.). The oxidizer 30 outputs an oxidized gas containing $CO_2$ for sequestration and generates heat due to the reaction. A fourth heat exchanger 32 receives the oxidized gas from the oxidizer 30 and cools the oxidized gas, forming, at least in part, an anode inlet stream 34. According to an exemplary embodiment, the oxidizer 30 generates exhaust, separate from the oxidized gas containing $CO_2$. Because exhaust from the oxidizer 30 does not form part of the oxidized gas output, air may be used for the oxidizer, eliminating the need for an air separation unit and/or water injection (e.g., for oxidizer temperature control).

As shown in FIG. 1, the system 1 further includes an EHS 40 (also referred to as a second fuel cell). The EHS 40 includes a cathode 42 (i.e., a second cathode), an anode 44 (i.e., a second anode), and a proton exchange membrane ("PEM") 46 disposed between the cathode 42 and the anode 44. The anode 44 receives the cooled anode inlet stream 34 from the fourth heat exchanger 32. At the anode 44, at least a portion of the hydrogen present in the anode inlet stream 34 is selectively oxidized to positively charge hydrogen ions ($H^+$), which are then transferred to the cathode 42 through the PEM 46. According to an exemplary embodiment the oxidizer 30, the air supply 26, and the heat exchanger 32 may be removed from the system 1 shown in FIG. 1 by incorporating a High Temperature Membrane ("HTM") operating in excess of 150° C. (e.g., as PBI or solid acid membrane) as a PEM. Referring still to FIG. 1, in the cathode 42, $H^+$ is reduced to gaseous hydrogen due to the absence of an oxidant. Therefore, the EHS 40 selectively generates and outputs a hydrogen stream 50 from the anode inlet stream 34. The hydrogen stream 50 is generated as co-product and may be used in the system 1 or exported. According to an exemplary embodiment, each of the shift reactors 21, 23 are configured to maximize hydrogen recovery in the corresponding high-temperature and low-temperature CO shift reactions and prevent carbon monoxide poisoning of an EHS catalyst. According to another exemplary embodiment, the hydrogen stream 50 may be compressed (e.g., electrochemically), with relatively low energy input. Advantageously, the transfer across the PEM 46 utilizes a minimum energy input and does not require any moving parts. According to an exemplary embodiment, the EHS 40 may recover approximately 95% of the hydrogen from the anode exhaust gas from the first fuel cell 10.

The anode 44 of the EHS 40 generates a second anode exhaust gas. The second anode exhaust gas may be fed to a condenser 60, which separates the second anode exhaust gas into a $CO_2$ stream 61 and a water stream (i.e., condensate) 66. The $CO_2$ stream 61 from the condenser 60 is then fed through a $CO_2$ compressor 62 to liquefy at least a portion of the $CO_2$ stream 61, generating a highly concentrated $CO_2$ supply 64 suitable for sequestration and/or export (i.e., transportation) to a point of use (e.g., for food processing). According to an exemplary embodiment, after removal of water in the condenser 60 to the water stream 66, the $CO_2$ stream 61 includes approximately 89% $CO_2$ and approximately 9% water.

Figure 2:
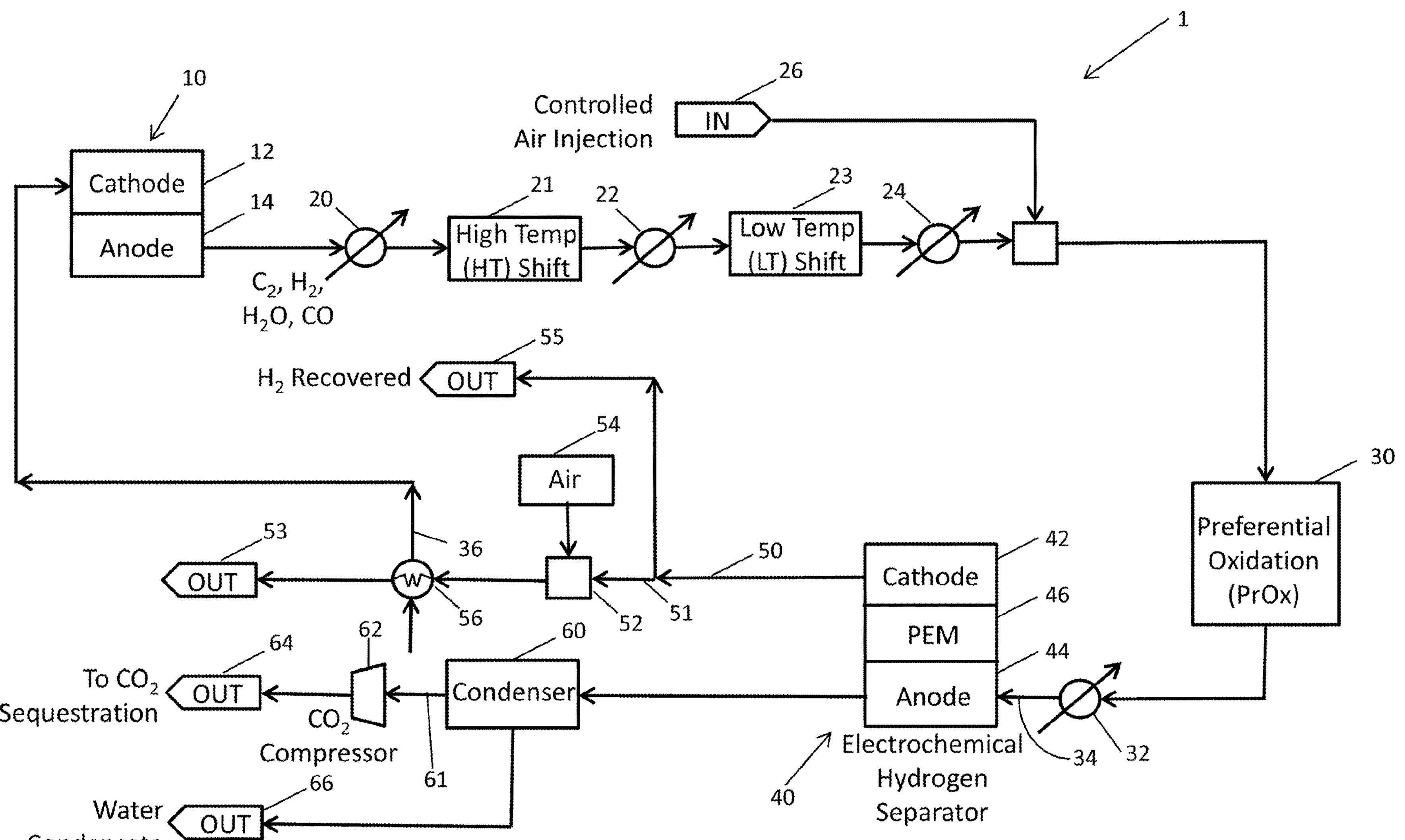
FIG. 2 shows a schematic view of a fuel cell system including a $CO_2$ sequestration subsystem using an electrochemical hydrogen separator, according to another exemplary embodiment.

As shown in FIG. 2, at least a portion of the hydrogen stream 50 may be oxidized using air to generate heat, according to another exemplary embodiment. A first portion 51 of the hydrogen stream 50 generated by the cathode 42 of the EHS 40 is fed to an oxidizer 52 (i.e., a second oxidizer) and is oxidized with air from an air supply 54 (i.e., a second air supply). The oxidization generates an oxidized hydrogen stream 53, including at least heat and water and is fed through a fifth heat exchanger 56. The fifth heat exchanger 56 transfers heat from the oxidized hydrogen stream 53 to preheat a cathode inlet stream 36 (e.g., desulfurized GHG from coal-fueled power plants), received by the first cathode 12 of the first fuel cell 10. According to another exemplary embodiment, the oxidized hydrogen stream 53 may be used to preheat a cathode inlet stream received by the cathode 42 of the EHS 40 or any other cathode. The oxidized hydrogen stream 53 may then be outputted from the system 1.

In the embodiment shown in FIG. 2, the first portion 51 of the hydrogen stream 50 used to heat the cathode inlet stream 36 includes approximately 45% of the hydrogen generated by the cathode 42. The remaining second portion 55 (e.g., approximately 55% of the hydrogen stream 50) is generated as co-product and may be used in the system 1 or exported. The percentage of the hydrogen stream 50 forming each portion 51, 55 may vary according to other exemplary embodiments. According to an exemplary embodiment, the first portion 51 of the hydrogen stream 50 may be limited to an amount necessary to provide a desired level of preheat to the cathode inlet stream 36. According to another exemplary embodiment, the second portion 55 of the hydrogen stream 50 (e.g., hydrogen not fed to the second oxidizer 52 to preheat the cathode inlet stream 36) may be recycled (e.g., fed) to the first anode 14 of the first fuel cell 10, thereby reducing the natural gas fuel input required to operate the first fuel cell 10.

Figure 3:
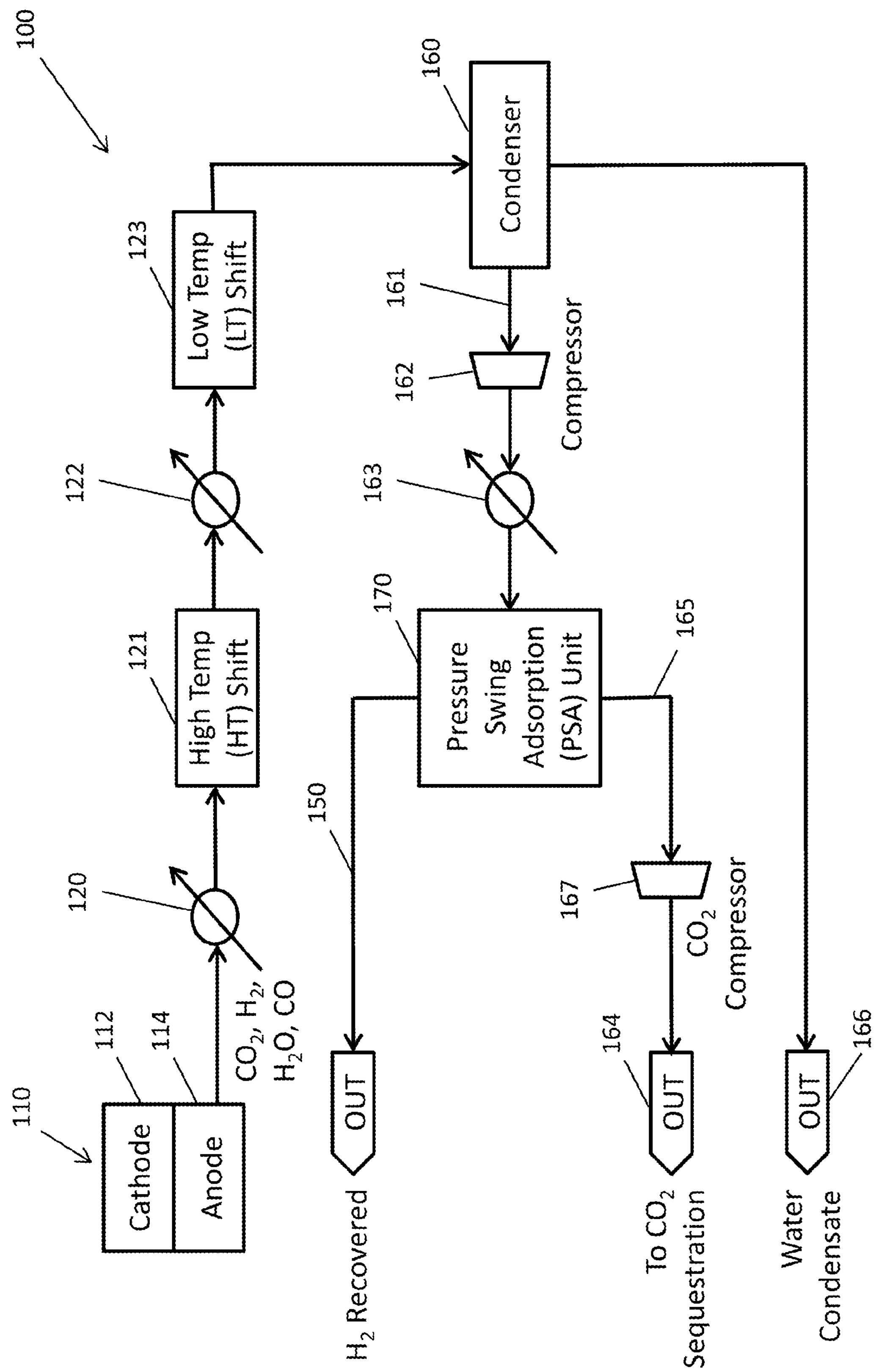
FIG. 3 shows a schematic view of a fuel cell system including a $CO_2$ sequestration subsystem using a pressure swing adsorption unit, according to an exemplary embodiment.

Referring now to FIG. 3, a post-treatment system is shown according to another exemplary embodiment. In this system, as with earlier exemplary embodiments, hydrogen present in anode exhaust gas is separated and recovered.

A fuel cell system 100 includes a fuel cell 110 having a cathode 112 and an anode 114. According to an exemplary embodiment, the fuel cell 110 may be a DFC substantially same as the first fuel cell 10. The anode 114 outputs an anode exhaust gas, including at least $CO_2$, hydrogen, water, and CO. A first heat exchanger 120 receives the anode exhaust gas from the DFC and partially cools the anode exhaust gas. The first heat exchanger 120 outputs a first partially-cooled gas. The first partially-cooled gas is transformed through a high-temperature CO shift reaction in a first shift reactor 121, forming a first shifted gas, which is received by a second heat exchanger 122. The first shift reactor 121 is configured to operate at a first temperature in a range of approximately 310° C. to 450° C. The first shift reactor 121 may be configured to shift CO and water into $CO_2$ and hydrogen, such that the first shifted gas has a higher concentration of $CO_2$ and hydrogen than the first partially-cooled gas. The second heat exchanger 122 partially cools the first shifted gas and outputs a second partially-cooled gas. The second partially-cooled gas is transformed through a low-temperature CO shift reaction in a second shift reactor 123, forming a second shifted gas, which is received by a condenser 160. The second shift reactor 123 is configured to operate at a second temperature in a range of approximately 200° C. to 250° C., such that the first temperature is higher than the second temperature. The second shift reactor 123 may be configured to shift CO and water into $CO_2$ and hydrogen, such that the second shifted gas has a higher concentration of $CO_2$ and hydrogen than the second partially-cooled gas. The condenser 160 separates the second shifted gas into a dried (e.g., dehydrated) anode exhaust gas stream 161, containing at least $CO_2$ and hydrogen, and a separate water stream (i.e., condensate) 166. For example, substantially all of the water is removed from the anode exhaust gas stream when forming the dried anode exhaust gas stream 161. The dried anode exhaust gas stream 161 from the condenser 160 is then fed through a compressor 162, forming a compressed anode exhaust gas stream, which is then fed through a third heat exchanger 163, to further cool the compressed anode exhaust gas stream. According to another exemplary embodiment, the third heat exchanger 163 may be disposed upstream from the compressor 162 (e.g., between the condenser 160 and the compressor 162) and is configured to cool the dried anode exhaust gas stream 161.

The system 100 includes a pressure swing adsorption ("PSA") unit 170. The PSA unit 170 is configured to receive the compressed anode exhaust gas stream from the third heat exchanger 163 and separate the stream into a hydrogen stream 150 and a $CO_2$ stream 165. In the PSA unit 170, the gases other than hydrogen (e.g. mostly $CO_2$ and some water) are adsorbed by an adsorbent bed media at high pressures and a pure hydrogen stream 150 is outputted from the PSA unit 170 at a pressure close to (e.g., substantially the same as) an inlet pressure of the compressed anode exhaust gas stream received at the PSA unit 170. The hydrogen stream 150 is generated as co-product and may be used in the system 100 or exported. After the adsorbent bed media in the PSA unit 170 reaches its maximum adsorbent capacity, it is purged to remove the adsorbed gases, which generate the $CO_2$ stream 165. This purging occurs by de-sorption, accomplished by lowering the pressure to near atmospheric pressure of approximately 20 psia. The $CO_2$ stream 165 is then fed to a $CO_2$ compressor 167 to liquefy at least a portion of the $CO_2$ stream 165, generating a sequestered $CO_2$ supply 164.

Figure 4:
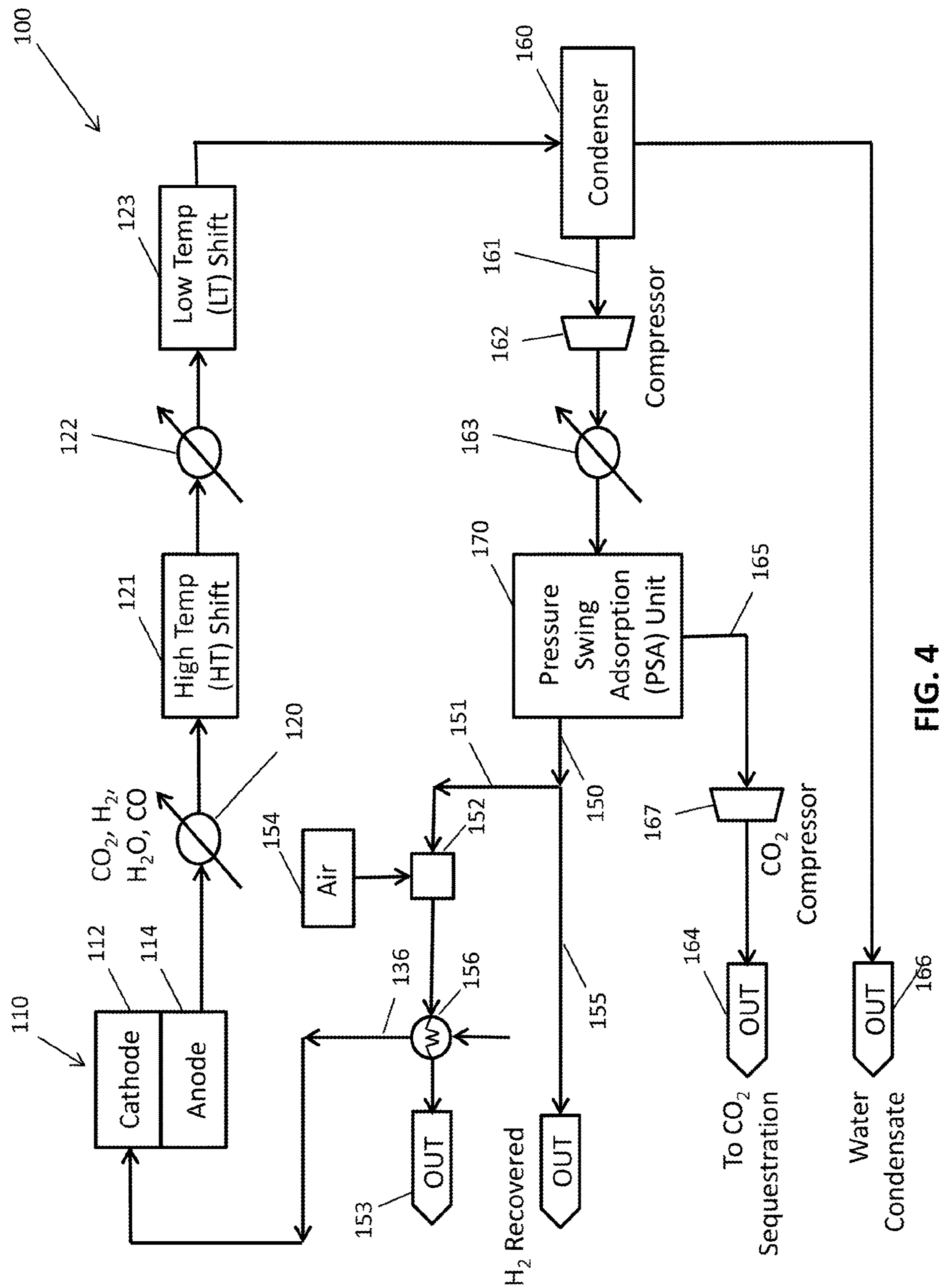
FIG. 4 shows a schematic view of a fuel cell system including a $CO_2$ sequestration subsystem using a pressure swing adsorption unit, according to another exemplary embodiment.

According to an exemplary embodiment, the system 100 may transform a portion of the hydrogen stream 150 in the same way as the hydrogen stream 50 as shown in FIG. 2. For example, as shown in FIG. 4, a first portion 151 of the hydrogen stream 150 generated by the PSA unit 170 is fed to an oxidizer 152 and oxidized with air from an air supply 154. The oxidization generates an oxidized hydrogen stream 153, including at least heat and water and is fed through a fourth heat exchanger 156. The fourth heat exchanger 156 transfers heat from the oxidized hydrogen stream 153 to preheat a cathode inlet stream 136 (e.g., desulfurized GHG from coal-fueled power plants), received by the cathode 112 of the first fuel cell 110. The oxidized hydrogen stream 153 may be outputted from the system 100. Similarly to FIG. 2, the first portion 151 of the hydrogen stream 50 may be limited to an amount necessary to provide a desired level of preheat to the cathode inlet stream 136. According to another exemplary embodiment, a remaining second portion 155 of the hydrogen stream 150 (e.g., hydrogen not fed to the oxidizer 152 to preheat the cathode inlet stream 136) may be recycled (e.g., fed) to the anode 114 of the fuel cell 110, thereby reducing the natural gas fuel input required to operate the fuel cell 110.

With regard to either system 1, 100, according to another exemplary embodiment, a process for sequestering $CO_2$ may include consuming all hydrogen and other combustibles in an oxidizer and utilizing the energy content for preheating a cathode inlet stream.

In certain embodiments, a fuel cell system includes a fuel cell having an anode and a cathode, an oxidizer, and an electrochemical hydrogen separator. The oxidizer is configured to receive anode exhaust gas from the anode and air from a controlled air supply and react the anode exhaust gas and the air in a preferential oxidation reaction. The separator is configured to receive oxidized gas from the oxidizer and to form separate streams of hydrogen and $CO_2$ from the remaining gas. A condenser is configured to receive the $CO_2$ stream from the oxidizer and condense the stream to separate water and liquefy $CO_2$.

In other embodiments, a fuel cell system includes a fuel cell having an anode and a cathode, a condenser, and a pressure swing adsorption unit. The condenser is configured to receive and condense anode exhaust gas from the anode and separate a water stream from the remaining condensed gas. A compressor receives and compresses the remaining condensed gas and feeds compressed gas to the pressure swing adsorption unit. The pressure swing adsorption unit separates a hydrogen stream and a $CO_2$ stream. The $CO_2$ stream is received by a second compressor configured to liquefy $CO_2$.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A fuel cell system comprising:

a first fuel cell comprising a first anode and a first cathode, wherein the first anode is configured to output a first anode exhaust gas;

a first oxidizer configured to receive the first anode exhaust gas and air from a first air supply, to react the first anode exhaust gas and the air in a preferential oxidation reaction, and to output an oxidized gas;

a second fuel cell configured to act as an electrochemical hydrogen separator, the second fuel cell comprising:

a second anode configured to receive the oxidized gas from the first oxidizer and to output a second anode exhaust gas, and a second cathode configured to output a hydrogen stream; and a condenser configured to receive the second anode exhaust gas and to separate water and $CO_2$.

2. The fuel cell system of claim 1, wherein the condenser outputs $CO_2$, and further comprising a compressor configured to receive and liquefy the $CO_2$ output from the condenser.

3. The fuel cell system of claim 1, further comprising a second oxidizer configured to receive a first portion of the hydrogen stream from the second cathode and air from a second air supply, and to output an oxidized hydrogen stream.

4. The fuel cell system of claim 3, further comprising a heat exchanger configured to receive and transfer heat from the oxidized hydrogen stream to a cathode inlet stream received by the first cathode.

5. The fuel cell system of claim 3, wherein the first anode is configured to receive a second portion of the hydrogen stream from the second cathode.

6. The fuel cell system of claim 1, further comprising:

a first heat exchanger configured to receive and cool the first anode exhaust gas and output a first partially-cooled gas;

a first CO shift reactor configured to receive the first partially-cooled gas, to perform a first CO shift reaction at a first temperature on the first partially-cooled gas, and to output a first shifted gas;

a second heat exchanger configured to receive and cool the first shifted gas, and to output a second partially-cooled gas;

a second CO shift reactor configured to receive the second partially-cooled gas, to perform a second CO shift reaction at a second temperature on the second partially-cooled gas, and to output a second shifted gas; and a third heat exchanger configured to receive and cool the second shifted gas, and to output a cooled gas;

wherein the first anode exhaust gas received at the first oxidizer is the cooled gas output from the third heat exchanger; and wherein the first temperature is higher than the second temperature.

7. A method of processing fuel cell exhaust, the method comprising:

at a first oxidizer, receiving a first anode exhaust gas from a first anode of a first fuel cell and air from a first air supply, wherein the first fuel cell comprises a first cathode;

outputting an oxidized gas from the first oxidizer;

at a second fuel cell having a second anode and a second cathode, receiving the oxidized gas at the second anode, electrochemically separating hydrogen in the oxidized gas, outputting a hydrogen stream from the second cathode, and outputting a second anode exhaust gas from the second anode.

8. The method of claim 7, further comprising:

at a condenser, receiving the second anode exhaust gas and separating water and $CO_2$ in the second anode exhaust gas; and at a compressor, receiving the $CO_2$ from the condenser and outputting liquefied $CO_2$.

9. The method of claim 7, further comprising:

at a first heat exchanger, cooling the first anode exhaust gas and outputting a first partially-cooled gas;

at a first CO shift reactor, performing a first CO shift reaction at a first temperature on the first partially-cooled gas and outputting a first shifted gas;

at a second heat exchanger, cooling the first shifted gas and outputting a second partially-cooled gas;

at a second CO shift reactor, performing a second CO shift reaction at a second temperature on the second partially-cooled gas and outputting a second shifted gas; and at a third heat exchanger, cooling the second shifted gas and outputting a cooled gas;

wherein the first anode exhaust gas received at the first oxidizer is the cooled gas output from the third heat exchanger; and wherein the first temperature is higher than the second temperature.

10. The method of claim 7, further comprising cooling the oxidized gas in a heat exchanger prior to feeding the oxidized gas to the second anode.

11. The method of claim 7, further comprising:

at a second oxidizer, receiving a first portion of the hydrogen stream and air from a second air supply and outputting an oxidized hydrogen stream; and transferring heat from the oxidized hydrogen stream to a cathode inlet stream received by the first cathode.

* * * * *